(12) United States Patent  (10) Patent No.: US 8,771,114 B2
Markovich et al.  (45) Date of Patent: *Jul. 8, 2014

(54) BASEBALL WITH IMPROVED CORE AND ENHANCED DURABILITY

(75) Inventors: Michael Markovich, Chicago, IL (US); Patrick J. Udelhofen, Chicago, IL (US); Frank M. Simonutti, Wheaton, IL (US); Benny Tong, Shanghai (CN); Bradley L. Gaff, Woodridge, IL (US); Ty B. Goodwin, Vancouver, WA (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,026

(22) Filed: Jul. 6, 2011

(65) Prior Publication Data

US 2013/0012344 A1  Jan. 10, 2013

(51) Int. Cl.
    *A63B 37/02* (2006.01)
(52) U.S. Cl.
    USPC ................ 473/604; 473/600; 473/602
(58) Field of Classification Search
    USPC ........................... 473/600, 601, 602
    See application file for complete search history.

(56) References Cited

U.S. PATENT DOCUMENTS

| | | |
|---|---|---|
| 1,546,483 A | 7/1925 | Fegan |
| 1,668,969 A | 5/1928 | Maynard |
| 1,671,237 A | 5/1928 | Grady |
| 2,358,535 A | 9/1944 | Reymond at al. ............... 18/55 |
| 3,942,793 A | 3/1976 | Lombardo ...................... 273/26 |
| 4,211,407 A | 7/1980 | Tomar ........................... 273/60 |
| 4,367,873 A | 1/1983 | Chang et al. ................... 273/60 |
| 4,529,200 A | 7/1985 | Miller et al. ................... 273/60 |
| 4,572,507 A | 2/1986 | Hubbert et al. ................. 273/60 |
| 4,610,071 A | 9/1986 | Miller .......................... 29/458 |
| 4,653,752 A | 3/1987 | Miller .......................... 273/60 |
| 4,880,233 A * | 11/1989 | Song ........................... 473/598 |
| 5,007,639 A | 4/1991 | Watson et al. .................. 273/60 |
| 5,123,659 A | 6/1992 | Williams ....................... 273/60 |
| 5,356,941 A * | 10/1994 | Sullivan et al. ................ 521/96 |
| 5,704,858 A | 1/1998 | Yang ........................... 473/602 |
| 5,788,591 A | 8/1998 | Decker ......................... 473/602 |
| 6,369,125 B1 | 4/2002 | Nesbitt ........................ 522/142 |
| 7,211,012 B2 | 5/2007 | Laliberty et al. ............... 473/601 |
| 2001/0000507 A1 | 4/2001 | Uchida et al. .................. 473/601 |
| 2010/0160079 A1* | 6/2010 | Kim et al. ..................... 473/373 |
| 2012/0244970 A1* | 9/2012 | Kume et al. ................... 473/601 |

* cited by examiner

*Primary Examiner* — Vishu K. Mendiratta
(74) *Attorney, Agent, or Firm* — Terence P. O'Brien

(57) ABSTRACT

A baseball capable of being tested under ASTM F1887-09 wherein the baseball is projected at a strike plate at a speed of approximately 60 mph to measure the COR of the baseball. The baseball includes a core formed of a diene-based rubber composition, at least one layer of yarn surrounding the core, and a cover assembly surrounding the one layer of yarn. The core has a diameter of less than 2.0 inches and a weight less than 1.5 ounces. The baseball has a circumference of less than 9.5 inches and a weight of less than 5.5 ounces. The baseball has an initial COR value when tested in accordance with ASTM F1887-09 and a second COR value measured after the baseball has undergone at least 60 impacts of approximately 60 mph against the strike plate. The second COR value is greater than 95 percent of the initial COR value.

31 Claims, 3 Drawing Sheets

BASEBALL WITH IMPROVED CORE AND ENHANCED DURABILITY

FIELD OF THE INVENTION

The present invention relates to baseballs and softballs having an improved core and enhanced durability.

BACKGROUND OF THE INVENTION

Baseball and softball organizations periodically publish and update equipment standards and/or requirements including performance limitations for ball bats. One recently issued standard is the Bat-Ball Coefficient of Restitution ("BBCOR") Standard adopted by the National Collegiate Athletic Association ("NCAA") on May 21, 2009. The BBCOR Standard, which became effective on Jan. 1, 2011 for NCAA baseball, is a principal part of the NCAA's effort, using available scientific data, to maintain as nearly as possible wood-like baseball bat performance in non-wood baseball bats. Although wood ball bats provide many beneficial features, they are prone to failure, and because wooden ball bats are typically solid (not hollow), wooden bats can be too heavy for younger players even at reduced bat lengths. Wood ball bats also provide little or no flexibility in the design of the hitting or barrel region of the bat. Non-wood bats, such as bats formed of aluminum, other alloys, composite fiber materials, thermoplastic materials and combinations thereof, allow for performance of the bat to be more readily tuned or adjusted throughout or along the hitting or barrel portion. Such characteristics enable non-wood bats to provide more consistent performance, increased reliability and increased durability than wood bats.

Other organizations have also adopted the BBCOR Standard. For example, the National Federation of State High School Associations (NFHS) has set Jan. 1, 2012 as the effective date for implementation of the BBCOR Standard for high school play. The BBCOR Standard includes a 0.500 BBCOR bat performance limit, which specifies that no point on the barrel or hitting portion of a bat can exceed the 0.500 BBCOR bat performance limit.

Bat manufacturers, such as DeMarini, have responded by producing bats that are certified under the BBCOR Standard. These bats generally have a slightly higher moment of inertia and can have stiffer barrels or impact regions than non-BBCOR baseball bats. BBCOR certified ball bats are configured not to exceed the 0.500 BBCOR bat performance limit. Therefore, BBCOR certified bats do not provide the same rebound or trampoline effect off the barrel of the bat as non-BBCOR certified bats.

Existing baseballs typically include a rubber encased cork center surrounded by one or more layers of yarn. The yarn can be wool or other synthetic materials. One or more foundation cotton layers can be positioned over the one or more layers of yarn, and two leather or synthetic leather cover panels can be applied over the cotton and yarn layers and stitched together.

The impact duration between existing baseballs and existing non-BBCOR certified ball bats is approximately 1 millisecond. The impact duration between a baseball and a BBCOR certified bat can be reduced such that less energy from the impact is absorbed by the BBCOR certified bat and more impact energy is absorbed by the baseball itself. The increased energy absorbed by the baseball can increase the deformation of the baseball upon impact and degrade the structural integrity of the baseball, such that the performance of the baseball decreases overtime and with increased impacts with a BBCOR certified bat. Accordingly, the usable life of existing baseballs can be significantly reduced when used with BBCOR certified ball bats. The degradation in performance of the baseball is illustrated by a decreased coefficient of restitution (COR) overtime and a significant decrease in ball compression overtime. Both of these reduced performance characteristics render a baseball less desirable for play and essentially unplayable. A decreased usable life of a baseball has many undesirable effects. It can cause a player, a team, a league or an organization to replace baseballs more frequently during games and during practice. The reduced usable life results in higher costs, more waste and general inefficiency.

Accordingly, a need exists to develop an improved baseball that can provide consistent performance overtime, and not exhibit a decreased usable life, when used with BBCOR certified ball bats. It would be desirable to produce a baseball that retains the performance characteristics of existing baseballs but also allows for extended useful life of the baseball even when used with BBCOR certified ball bats. It would be advantageous to provide a baseball that doesn't exhibit a significant decrease in compression and COR overtime when used with a BBCOR certified ball bat, and maintains a feel that is consistent with existing baseballs.

SUMMARY OF THE INVENTION

The present invention provides a baseball capable of being tested under ASTM Standard Test Method F1887-09 wherein the baseball is projected at a strike plate at a speed of approximately 60 mph to measure the coefficient of restitution (COR) of the baseball. The baseball includes a core formed of a diene-based rubber composition, at least one layer of yarn surrounding the core, and a cover assembly surrounding the at least one layer of yarn. The core has a diameter of less than 2.0 inches and a weight less than 1.5 ounces. The baseball has a circumference of less than 9.5 inches and a weight of less than 5.5 ounces. The baseball also has an initial COR value when tested in accordance with ASTM F1887-09 and a second COR value measured after the baseball has undergone at least 60 impacts of approximately 60 mph against the strike plate. The second COR value is greater than 95 percent of the initial COR value.

According to a principal aspect of a preferred form of the invention, a core formed of a diene-based rubber composition, at least one layer of yarn surrounding the core, and a cover assembly surrounding the at least one layer of yarn. The composition of the core includes 100 parts by weight of a diene rubber, 10 to 30 parts by weight of a co-crosslinking agent, 1 to 10 parts by weight of a metal oxide activator, 0.1 to 3 parts by weight of a peroxide initiator, and 0 to 30 parts by weight of an inorganic filler.

This invention will become more fully understood from the following detailed description, taken in conjunction with the accompanying drawings described herein below, and wherein like reference numerals refer to like parts.

DETAILED DESCRIPTION OF THE INVENTION

Figure 1:
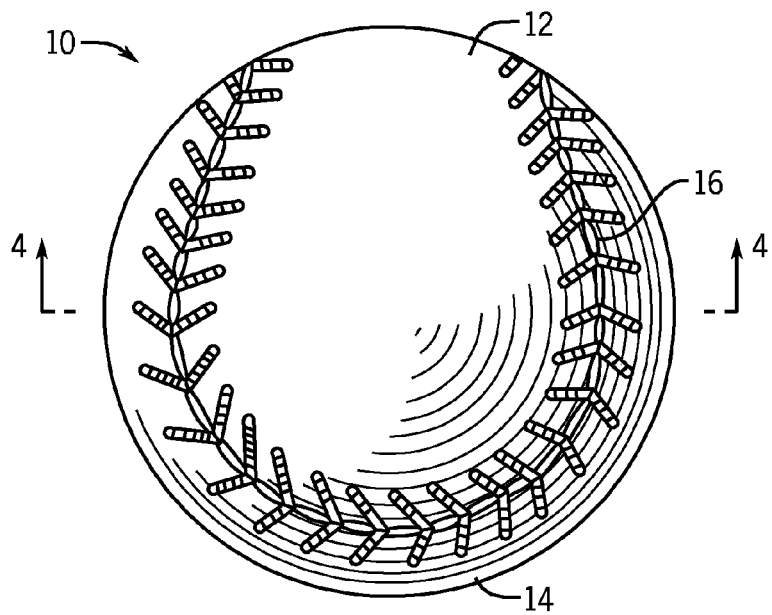
FIG. 1 is a side view of a baseball in accordance with a preferred embodiment of the present invention.

Referring to FIG. 1, a baseball is generally indicated at 10. The ball 10 of FIG. 1 is configured as a baseball; however, the invention can also be applied to a softball. The baseball 10 is a spherical body having a cover assembly 12 formed of two cover panels 14 connected to each other by a stitching 16. Baseballs are produced for many different levels of play, applications, ages, price points, etc. The composition and material quality of baseballs can vary from one application to another. Baseballs are typically formed to have a weight of approximately five ounces and a circumference of approximately nine inches. Baseballs generally have a circumference of less than 9.5 inches and a weight of less than 5.5 ounces. The weight or weight range of baseballs can vary, such as, for example, 5.0 to 5.25 ounces avoirdupois, 5.0 to 5.5 ounces avoirdupois. The circumference of a baseball can also vary, such as, for example, 9.0 to 9.25 inches, 8.85 to 9.15 inches and 9.0 to 9.5 inches. Other weights, weight ranges, circumference measurements and circumference ranges can also be used for baseballs.

Ball compression and coefficient of restitution (COR) of a ball are two other characteristics that are typically used to measure and differentiate one ball or type of ball from another. Ball compression relates to a static compression-displacement measurement of a ball that can be correlated to the dynamic properties of the ball. ASTM Standard Test Method F1888-09 entitled "Standard Test Method for Compression-Displacement of Baseballs and Softballs" is intended to provide a uniform method of measuring ball displacement and determining the corresponding compression of baseballs and softballs. The F1888-09 Test Method specifies the placement of a baseball (or softball) between two flat-plate surfaces of a compression machine having a load cell. Then, the Method includes compressing the ball to a standard displacement of 6.35 mm (or 0.25 in) and measuring the peak load (force) applied to the ball to achieve the 6.35 mm displacement. The baseball is typically first centered in the compression machine such that its vertical axis aligns with the vertical axis of the compression machine such that compression occurs between the ball seams. A one pound or four pound preload is applied to the ball based upon the expected compression value of the ball. The displacement gauge of the compression machine is zeroed and the compression of the ball is commenced. A compressive load is applied to the ball to achieve the 6.35 mm displacement over a period of 12 to 18 seconds. The peak load (or force) applied to the ball during the compression is recorded. The load is released, the ball is rotated 90 degrees and the compression test is repeated. Ball compression is then calculated as the average of the two measured forces required to compress the test ball 6.35 mm on the two different axes of the ball.

Different baseball leagues have different compression specification ranges for baseballs. For example, the NCAA and Major League Baseball have a compression specification of 200 to 300 lbs, and for some age groups, Little League has a compression range of 250 to 350 lbs. Other compression specifications or ranges can also be used. As the compression value of a ball drops, the performance and feel of the ball also drops. A ball with a significant loss of its compression can become unplayable for many play conditions and/or applications.

Figure 2:
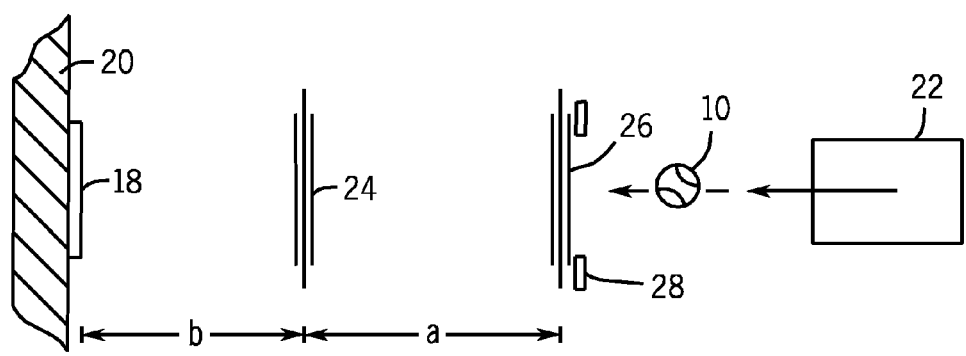
FIG. 2 is a schematic of a ball COR measurement test apparatus in accordance with ASTM Standard Test Method F1887-09.

The COR of a baseball can be measured using ASTM Standard Test Method No. F1887-09 entitled "Standard Test Method for Measuring the Coefficient of Restitution (COR) of Baseballs and Softballs." The F1887-09 Test Method is intended to provide a uniform, single and repeatable method of measuring the COR of baseballs and softballs. Referring to FIG. 2, an example of baseball COR measurement test apparatus is shown. The F1887-09 Test Method is based on ball speed measurements before and after impact with a strike plate 18. The strike plate 18 can be formed of either a 2 in thick steel plate having a length of 24 inches and a width of 24 inches. The strike plate 18 is mounted flush to a massive rigid wall 20 of cinder block or concrete and bolted at all four corners to prevent movement of the plate during impact. Alternatively, the strike plate 18 can be formed of a thick northern white ash wood with moisture content between 10 and 15 percent with a flat smooth surface. A ball throwing device 22 capable of projecting or delivering a ball 10 through first and second electronic speed monitors 24 and 26 of 26.82 m/s (or 60 mph) with a maximum tolerance of plus or minus 0.30 m/s is used. The electronic speed monitors 24 and 26 consist of two vertical light screens mounted 30.48 cm (12 inches) apart with a tolerance of plus or minus 0.32 cm, and a photoelectric sensor located at each screen that triggers a timing device on ball passage to measure the time for the ball 10 to traverse the distance, a, between the two vertical planes of the light screens before and after impact with the strike plate 18.

The ball throwing device 22 is set to deliver or project the baseball 10 at 60 mph at the strike plate 18, and from a distance that is 8 feet or less from the strike plate 18. The first electronic speed monitor 24 is positioned a distance, b, of 12 inches from the strike plate 18. A target 28 having a 12 inch diameter opening can be placed between the second electronic speed monitor 26 and the ball throwing machine 22. The ball 10 is shot at the strike plate 18 a minimum of six times and a maximum of 12 times with a minimum 30 second rest period between each shot. The average of six acceptable COR values for the ball is then used to determine the ball COR.

Different baseball leagues have different maximum allowable COR requirements for baseballs. For example, the NCAA and the NFHS each have a COR range of 0.555 or less. Other COR limits or ranges can also be used.

Figure 3:
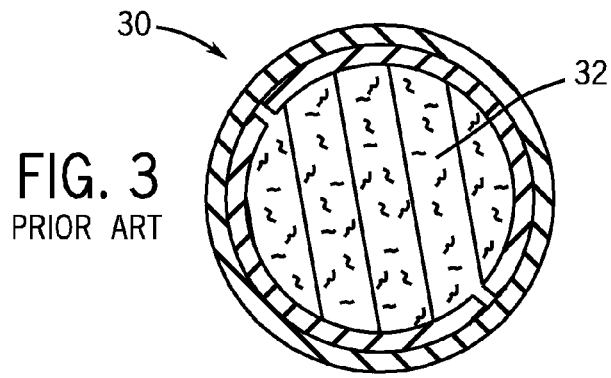
FIG. 3 is cross-sectional view of a prior art core of a baseball.

Referring to FIG. 3, a cross-sectional view of a prior art, rubber encased cork core 30 (or pill) of a baseball is shown. The core 30 is a spherical layered structure centered within the baseball. Many existing baseballs, including for example a Wilson® Model A1030 baseball produced by Wilson Sporting Goods Co. of Chicago, Ill., include the core 30 having a center 32 formed of cork. The cork center 32 is substantially encased or surrounded by first and second layers 34 and 36 of first and second non-diene based rubber materials. The second layer 36 surrounds the first layer 34. The rubber materials of the first and second layers 34 and 36 are typically formed of natural rubber but vary in hardness, elasticity and/or color. Other prior art core configurations can be formed by a blend or mixture of cork and natural rubber. Such cork/natural rubber cores can be formed as centers that are substantially encased by one or more outer natural rubber layers. In other prior art balls, the core could be formed of a natural rubber.

Figure 4:
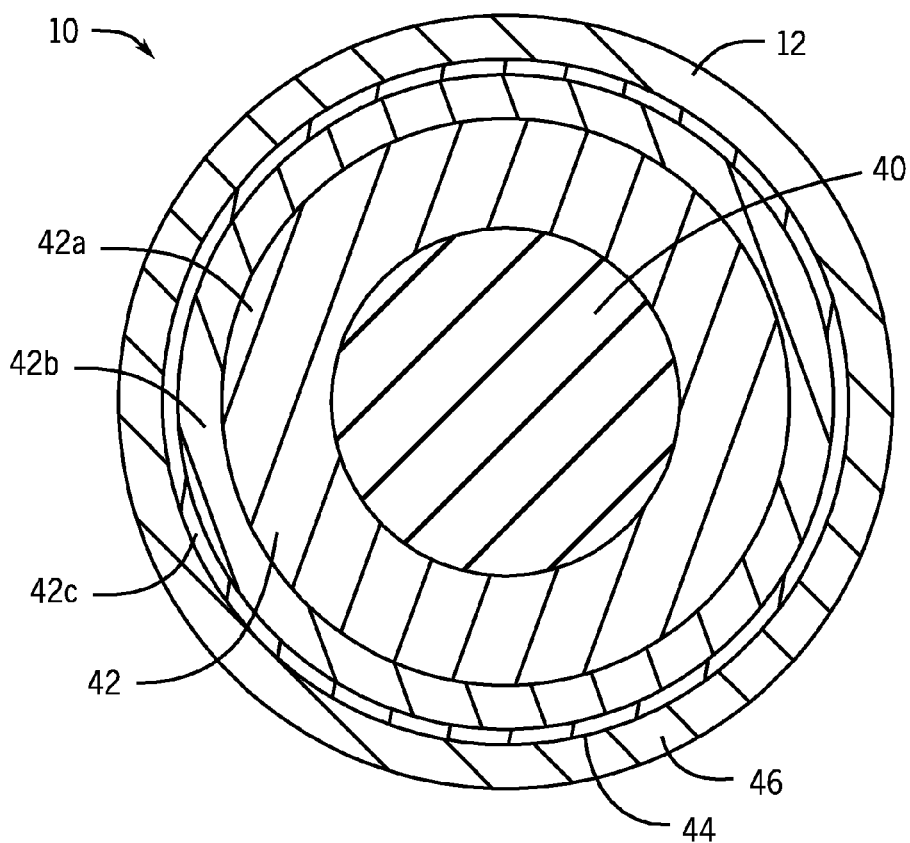
FIG. 4 is cross-sectional view of the baseball of FIG. 1.

Referring to FIG. 4, the baseball 10 constructed in accordance with one preferred embodiment of the present invention is shown in greater detail. The baseball 10 includes an improved core 40 positioned within the center of the baseball, at least one inner yarn layer 42 surrounding the core 40, at least one layer of foundation windings 44 surrounding the yarn layers 42, a finish winding layer 46 surrounding the foundation windings 44, and the cover assembly 12 surrounds the finish winding layer 46.

The core 40 is sphere formed of a rubber composition. The core 40 is preferably formed as a solid, homogeneous, one piece generally spherical body. Alternatively, the sphere can be formed of two or more layers of materials, such as two or more rubber compositions. In other alternative preferred embodiments, the core 40 can be hollow and define a centrally positioned cavity. The core 40 preferably has an outer diameter within the range of 1.0 to 2.0 inches, and more preferably within the range of 1.3 to 1.5 inches. The core has a weight of less than 1.5 ounces. Preferably, the core has a weight within the range of 20 to 28 grams (0.71 to 0.99 ounce) and more preferably within the range of 22 to 26 grams (0.78 to 0.92 ounce). The core 40 has a rebound of at least 50 percent, and more preferably of at least 65 percent measured by dropping the core (or a ball) from a predetermined height onto a smooth hard surface (such as a polished stone) and measuring the maximum height of the rebound or bounce. The rebound percentage is obtained from the quotient of the maximum rebound height over the drop height.

The rubber composition of the core 40 is comprised of one or more diene-based rubber materials, a co-crosslinking agent, an activator, and a free radical initiator. In one preferred embodiment, the diene-based rubber material is a polybutadiene rubber, and, more preferably a polybutadiene rubber having a cis-1,4 content of greater than 35 percent. In another preferred embodiment, the polybutadiene rubber has a cis-1,4 content of greater than 90 percent.

In preferred embodiments, the core 40 can be formed of 0 to 100 phr of high-cis polybutadiene rubber. The term phr refers to the parts of any non-elastomeric (non-rubber) material per hundred parts of raw gum elastomer (rubber material) or "parts per hundred rubber" or "parts per hundred resin". In one particularly preferred embodiment, the core 40 can be formed of 100 phr of high-cis polybutadiene rubber.

In alternative preferred embodiments, the diene-based rubber materials can be an acrylonitrile-butadiene rubber, or one or more blends of high-cis polybutadiene rubber and acrylonitrile-butadiene rubber. The acrylonitrile-butadiene rubber is a co-polymer and preferably has an acrylonitrile content of greater than 25 percent, and more preferably between 30 to 40 percent. In one particularly preferred embodiment, the acrylonitrile-butadiene rubber preferably has an acrylonitrile content within the range of 32 to 34 percent.

In some preferred embodiments, the level of acrylonitrile-butadiene rubber can be varied from 0 to 100 parts per hundred rubber (phr). The acrylonitrile-butadiene rubber can be used to adjust (increase or decrease) the rebound properties of the core 40. In particular, the addition of acrylonitrile-butadiene results in a decrease in rebound of the core 40. The addition of acrylonitrile-butadiene to the composition of the core 40 thereby provides a means to adjust the rebound of the core, and therefore a means of adjusting the COR of the ball 10. The level of acrylonitrile-butadience in the composition of the core 40 of the ball can be varied from 0 to 100 phr. In more preferred embodiments, the level of acrylonitrile-butadiene rubber can be varied from 0 to 75 phr, and in other more preferred embodiments, the level of acrylonitrile-butadiene rubber can be varied from 0 to 40 phr. In one particularly preferred embodiment, the core 40 includes 80 phr of high-cis polybutadiene rubber and 20 phr of acrylonitrile-butadiene rubber. In another particularly preferred embodiment, the core 40 includes 60 phr of high-cis polybutadiene rubber and 40 phr of acrylonitrile-butadiene rubber. In other alternative preferred embodiments, other phr levels of high-cis polybutadiene rubber and acrylonitrile-butadiene rubber can be used.

When referring to elastomeric or rubber materials in this application the phr value totals 100. So, the composition of a core could be 80 phr high-cis polybutadiene rubber and 20 phr acrylonitrile-butadiene rubber. Other blends of acrylonitrile-butadiene rubber and high-cis polybutadiene rubber can be used provided the rubbers total 100 phr. Other ingredients that are not elastomeric, such as, for example, zinc diacrylate, would be added to the composition of the core in an amount listed in phr, but the non-elastomeric value is not part of the 100 parts of rubber or resin. It is used to define the amount of the non-elastomeric ingredient in the composition in reference to the 100 parts of rubber or resin in the composition.

The co-crosslinking agent can be a metal salt. In one preferred embodiment, the metal salt is a zinc salt of an unsaturated acrylate ester. In one particularly preferred embodiment, the metal salt is a zinc diacrylate. In another preferred embodiment, the metal salt of the unsaturated acrylate ester preferably also comprises a fatty acid salt in an amount of up to 10 percent of the total of the metal salt of the unsaturated acrylate ester and the fatty acid salt. One particularly preferred fatty acid salt is zinc stearate, and one particularly preferred composition of the co-crosslinking agent could be 92 percent zinc diacrylate and 8 percent zinc stearate. In alternative preferred embodiments, other metal salts and other fatty acid salts can also be used. In one preferred embodiment, the rubber composition of the core 40 can include 10 to 30 parts by weight (or phr) of the co-crosslinking agent, and more preferably, approximately 20 parts by weight of the co-crosslinking agent.

The activator is preferably a metal oxide activator. One preferred metal oxide activator would be a zinc oxide activator. The rubber composition of the core 40 can include 1 to 10 parts by weight of the activator. In a particularly preferred embodiment, the rubber composition of the core 40 includes 5 parts by weight (or phr) of the activator.

The free radical initiator is preferably a peroxide. In a particularly preferred embodiment, the free-radical initiator is a 1, 1-di-(tert-butylperoxy)-3, 3, 5-trimethylcyclohexane. The rubber composition of the core 40 can include 0.1 to 3 parts by weight (or phr) of the free radical initiator. In a particularly preferred embodiment, the rubber composition of the core 40 includes 1.54 parts by weight of the free radical initiator.

In an alternative preferred embodiment, the rubber composition of the core 40 can also include one or more inorganic fillers for adjusting the weight of the core 40. The inorganic fillers can be barium sulfate, calcium carbonate and combinations thereof. In one particularly preferred embodiment, the core 40 can include 0 to 30 parts by weight (phr) of inorganic fillers.

The solid one piece diene-based rubber core 40 is significantly more durable and retains its compression better than prior art rubber encased cork cores. As a result, the durability and compression loss of balls 10 formed with the solid one piece diene-based rubber core 40 is significantly improved over prior art baseballs having cores from of rubber encased cork. As a result, balls formed with the core 40 experience a longer playable life than other balls with conventional core designs.

Figure 5:
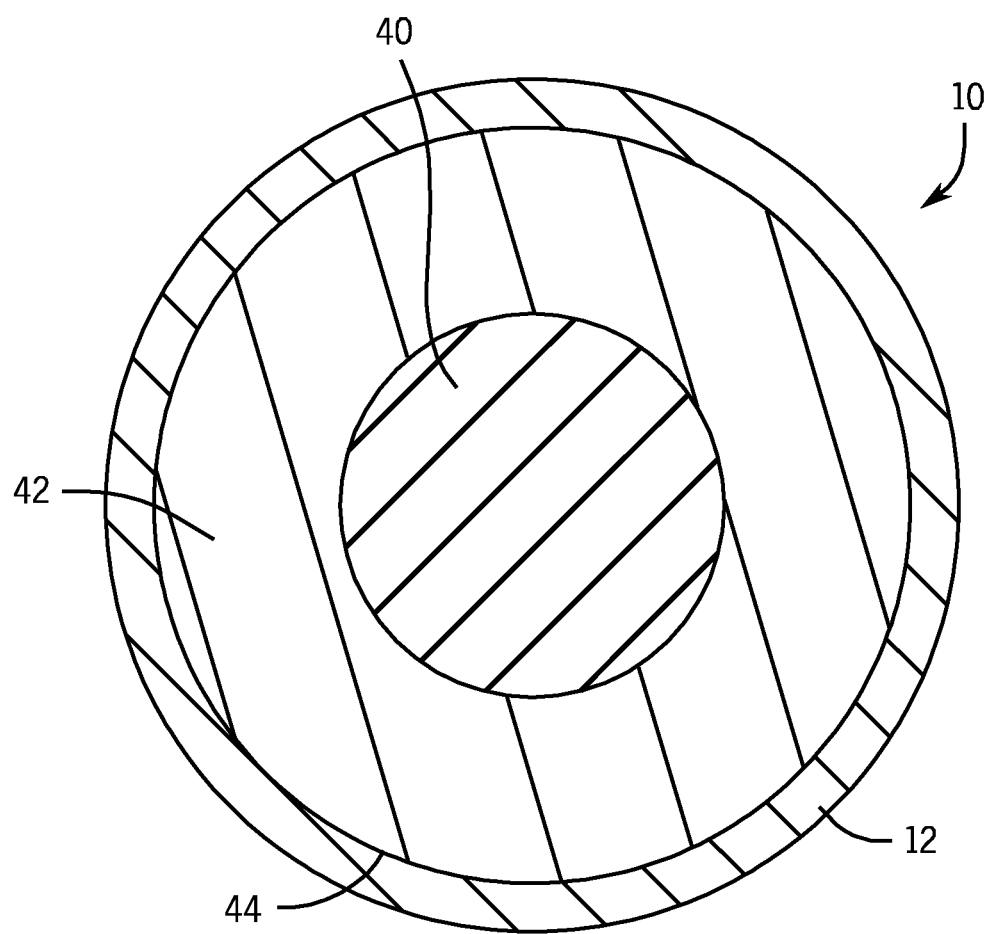
FIG. 5 is a cross-sectional view of a baseball according to an alternative preferred embodiment of the present invention.

The at least one inner yarn layer 42 surrounding the core 40 can be at least one layer of single or multi-ply yarn windings. The yarn windings can be single-ply, five-ply, three ply, other numbers of ply values or combinations thereof. The yarn windings can formed of wool, synthetic yarn, synthetic recycled fibers (such as from used carpet), cotton fibers or combinations thereof. The synthetic yarn can be formed of polyester, rayon, acrylic, other synthetic materials, and combinations thereof. In one particularly preferred embodiment, the yarn layers 42 are five-ply yarn windings wherein the yarn is formed 85 percent wool and 15 synthetic fibers. In other alternative preferred embodiments, combinations and percentages of wool and synthetic fibers can be used. The percentage of wool can vary from 0 to 100 percent and the percentage of synthetic fibers can vary from 0 to 100 percent. Generally, the quality of the yarn layers 42 increases as the percentage of wool increases. The color of the yarn layers 42 can also vary from layer to layer. In the embodiment of FIG. 4, the at least one inner yarn layer 42 is formed of three inner yarn layers 42a, 42b and 42c. The inner layer 42a can be formed of a five-ply, gray-colored, 85 percent wool/15 percent synthetic fiber windings, the inner layer 42b can be a three-ply, white colored, 85 percent wool/15 percent synthetic fiber windings, and the inner layer 42c can be a three-ply, gray-colored, 85 percent wool/15 percent synthetic fiber windings. Referring to FIG. 5, an alternative preferred embodiment of the present invention is illustrated. In the embodiment of FIG. 5, the at least one inner yarn layer 42 is a single layer formed of three-ply, gray-colored, 100 percent synthetic fiber windings. In alternative preferred embodiments, other numbers of layers of single or multi-ply yarn winding layers can be used.

Referring to FIGS. 3 and 4, the at least one layer of foundation windings 44 can be formed of a fine winding fibers to provide a smooth finish or outer surface to the ball 10 beneath the cover assembly 12. In one particularly preferred embodiment, the foundation windings 44 are formed of 20/3 white cotton. In other preferred embodiments, other materials can be used to form the fine winding fibers of the foundation windings 44.

The finish winding layer 46 surrounds the foundation windings 44 and provides a smooth spherical outer surface to the ball 10 attachment to the cover assembly 12. In one preferred embodiment, the finish winding layer 46 can be formed of synthetic poly-vinyl acetate thread, such as Vinylon threads. In alternative preferred embodiments, the winding layer 46 can be formed of other fine, high tensile strength fibers. In other alternative preferred embodiments, the ball can be formed without the finish winding layer 46 and the cover assembly 12 can be attached directly to the foundation windings. In other alternative preferred embodiments, the ball 10 can be formed of one or more layers of foundation windings 44 and without a finishing winding layer 46. In other alternative preferred embodiments, the ball can be formed of one or more finishing winding layers 46 and no layers of foundation windings. In yet another alternative preferred embodiment, the ball can be formed without a layer of foundation windings and without a finishing winding layer.

Referring to FIGS. 1 and 4, the two cover panels 14 of the cover assembly 12 are connected to each other by the stitching 16 and form at least one seam 50. Although conventional baseballs have one continuous seam, the single seam is often referred to as more than one seam when describing certain pitches, e.g., a four seam fastball. The seam 50 can be generally flush with the outer diameter of the ball. Alternatively, the at least one seam can be raised or slightly raised with respect to the central regions of the cover panels. The stitching 16 is formed of a high tensile strength thread, such as, for example, a Kevlar® thread material. Alternatively, other high tensile strength thread materials can also be used. The cover panels 14 are formed of a durable, high strength material, such as natural leather. Alternatively, the cover panels can be formed of other durable materials such as a split leather, synthetic leather, a polyurethane, a PVC, or combinations thereof.

EXAMPLES

Baseballs were formed in accordance with three separate embodiments of the present invention and are set forth below as Examples (Ex. 1, Ex. 2 and Ex. 3). Each of the three embodiments include a solid core formed of diene-based rubber compositions according to the Core Formulas specified in Table 1 (C-1, C-2 and C-3). The diameter, weight and rebound of the cores formed under the three Core Formulas are also listed.

TABLE 1

Core Formulas/Properties

| Material | C-1 | C-2 | C-3 |
|---|---|---|---|
| Karbochem Neodene-40 | 100 phr | 80 phr | 60 phr |
| Europrene N-3330 | 0 phr | 20 phr | 40 phr |
| K-Cure 339 zinc diacrylate | 20 phr | 20 phr | 20 phr |
| Zinc Oxide | 5 phr | 5 phr | 5 phr |
| Stearic Acid | 3 phr | 3 phr | 3 phr |
| Triganox 29/40 | 1.54 phr | 1.54 phr | 1.54 phr |
| Diameter (inches) | 1.4075 | 1.4035 | 1.3925 |
| Weight (grams) | 25.09 | 24.95 | 24.65 |
| Rebound | 86% | 77% | 69% |

Karbochem ® Neodene 40 is a neodymium catalyzed high-cis content polybutadiene rubber produced by Karbochem (PTY) Ltd., a Division of Sentrachem Ltd, P O Box 98881, Sloane Park 2152, South Africa.
Europrene ® N-3330 is an acrylonitrile-butadiene rubber having an acrylonitrile content of 32-34%, produced by Polimieri Europa, a subsidiary of Eni S.p.A., Rome, Italy.
K-Cure 339 is a co-crosslinking agent produced by Kingyorker Enterprise, Co. of Taipei City, Taiwan.
Triganox ® 29/40 is 1,1-Di-(t-butylperoxy)-3,3,5-trimethylcyclohexane (40% active) produced by Akzo Nobel Chemicals, Inc. of Chicago, Illinois.

Example C-1

Core Example C-1 is comprised of 100 phr of high-cis polybutadiene, and has a rebound of ~86%.

Example C-2

Core Example C-2 is comprised of a blend of 80 phr high-cis polybutadiene and 20 phr of acrylonitrile-butadiene, and has a rebound of ~77%.

Example C-3

Core Example C-3 is comprised of a blend of 60 phr high-cis polybutadiene and 40 phr of acrylonitrile-butadiene, and has a rebound of ~69%.

Importantly, the addition of the acrylonitrile-butadiene results in a decrease in rebound of the solid center core, which allows for the rebound of the core to be controlled by increasing or decreasing the quantity of acrylonitrile-butadiene. Adjustments to the rebound of the core enable the COR of the baseball 10 to be adjusted.

Wilson® WTA-1010 baseballs, Example balls EX-1, EX-2 and EX-3, typically used as high school and college game and practice balls, were produced using the cores C-1, C-2 and C-3, respectively. The results are shown below in Table 2. The Specification data provided is one example of a specification data for one particular baseball application. Baseballs can be configured to meet different Specifications depending upon a particular application or other factors. In other Specifications, different ranges for size, weight, C.O.R. and compression can be used. For example, in some applications, the specification for C.O.R. includes a maximum value of 0.550.

TABLE 2

Ball Properties

| Properties | EX-1 | EX-2 | EX-3 | Specification |
|---|---|---|---|---|
| Core: | C-1 | C-2 | C-3 | |
| Size: | 9.10" | 9.05" | 9.04" | 9-9.25" |
| Weight: | 143.8 g | 145.5 g | 145.0 g | 142-149 g |
| C.O.R.: | 0.578 | 0.570 | 0.564 | 0.516-0.576 |
| Compression: | 277 | 266 | 268 | 250-350 lb. |
| Compression-100 hits: | 248 | 248 | 234 | |
| Compression-70 hits | | | | |
| Compression Loss-%: | −10.5% | −6.8% | −16.4% | <35% |

Baseball C.O.R. is measured in accordance with ASTM F1887 and Baseball Compression is measured in accordance with ASTM F1888.
Compression Loss - In accordance ASTM F1887, the Example baseballs were projected at approximately 88 ft/s (60 mph) at a steel strike plate, and then measured for compression in accordance with ASTM F1888 after every 20 hits. Balls were hit a total of 100 times. The equation used to calculate compression loss after 100 impacts (hits) against the strike plate is: Compression Loss = [(Compression Before Hitting) − (Compression After 100 Hits)]/(Compression Before Hitting).

Example EX-1

The ball of example EX-1 comprises a center comprising 100 phr of high-cis polybutadiene rubber in the center composition. The ball of example EX-1 exhibited a C.O.R. of 0.578, a compression (before hitting) of 277 lb., and a compression after 100 hits of 248 lb. The compression loss of the baseball of example EX-1 is ~10.5%.

Example EX-2

The ball of example EX-2 comprises a center comprising 80 phr of high-cis polybutadiene rubber and 20 phr of acrylonitrile-butadiene rubber in the center composition. The ball of example EX-1 exhibited a C.O.R. of 0.570, a compression (before hitting) of 266 lb., and a compression after hitting of 248 lb. The compression loss of the baseball of example EX-1 after 100 hits is ~6.8%.

Example EX-3

The ball of example EX-3 comprises a center comprising 60 phr of high-cis polybutadiene rubber and 40 phr of acrylonitrile-butadiene rubber in the center composition. The ball of example EX-1 exhibited a C.O.R. of 0.564, a compression (before hitting) of 268 lb., and a compression after 100 hits of 234 lb. The compression loss of the baseball of example EX-1 is ~16.3%.

The balls of the examples (EX-1, EX-2 and EX-3) exhibit compression loss values that are significantly lower than the specification limit—and significantly lower than balls made using conventional rubber encased cork composition. The testing of these Examples also illustrates that the addition/increase of the acrylonitrile-butadiene rubber content in the solid core composition results in a decrease in C.O.R. of the Example baseballs.

Table 3 provides a listing of baseball COR and Compression data of three sample model baseballs produced in accordance with the present invention (EX-4, EX-5, and EX-6) and existing baseballs produced by Wilson (EX-7 & EX-8) and other competitors in the baseball market (C1 through C11). Two of the sample model baseballs, Wilson 20 ACN and Wilson 40 ACN, were produced with a core formed of a diene-based rubber composition having 20 phr and 40 phr acrylonitrile-butadiene rubber content, respectively. The baseballs C1 through C11 are existing baseballs from other competitors in the baseball market. The test data below illustrates the improved durability/compress retention characteristics of the baseballs produced in accordance with the present invention (EX-4, EX-5 & EX-6) as compared with existing baseballs in the market.

TABLE 3

Compression Loss After 70 Impacts of 60 mph Against a Steel Strike Plate

| Ex # | Ball | Size (in.) | Weight (g) | COR | Comp. (lbf) | Comp After 70 hits (lbf) | Comp Loss (%) |
|---|---|---|---|---|---|---|---|
| EX-4 | Wilson 20ACN | 9.07 | 146.0 | 0.558 | 276.8 | 215.4 | 22.2 |
| EX-5 | Wilson 40ACN | 9.06 | 145.7 | 0.551 | 268.3 | 209.3 | 22.0 |
| EX-6 | Wilson 1025 BBCOR | 8.99 | 148.2 | 0.54 | 367.8 | 278.2 | 24.4 |
| EX-7 | Wilson ® A1030B H.S. & Adult Practice Ball & Youth League Play | 8.98 | 143.3 | 0.529 | 335.8 | 219.8 | 35.5 |
| EX-8 | Wilson ® A1060 Youth League Play Ball | 9.1 | 143.8 | 0.509 | 283.5 | 171.7 | 39.4 |
| C-1 | Diamond ® D1-Pro | 8.99 | 143.2 | 0.532 | 309.4 | 200.7 | 35.1 |
| C-2 | Diamond ® D1-NFS | 8.96 | 142.2 | 0.536 | 358.4 | 248.2 | 30.7 |
| C-3 | Rawlings ® R1NCAA | 9.03 | 142.5 | 0.536 | 203.6 | 134.2 | 34.1 |
| C-4 | Diamond ® DLL RS-T | 9.07 | 146.4 | 0.528 | 246.2 | 167.6 | 31.9 |
| C-5 | Diamond ® DSLL RS-T | 9.05 | 146.3 | 0.521 | 283.3 | 173.4 | 38.8 |
| C-6 | Rawlings ® RPLB1 | 9.04 | 144.7 | 0.528 | 197.4 | 123.3 | 37.5 |
| C-7 | Rawlings ® RSLL-1 | 9.07 | 146.7 | 0.530 | 232.5 | 140.4 | 39.6 |
| C-8 | Diamond ® DBP | 8.93' | 140.5 | 0.522 | 267.6 | 179.5 | 32.9 |
| C-9 | Rawlings ® ROLB1X | 9.12 | 144.6 | 0.509 | 204.2 | 92.5 | 54.7 |
| C-10 | Rawlings ® R100 HSX | 9.07 | 144.8 | 0.507 | 246.9 | 125.4 | 49.2 |
| C-11 | Rawlings ® RPBX | 9.06 | 144.6 | 0.522 | 239.8 | 119 | 50.4 |

Diamond ® is a registered trademark of Diamond Baseball Company, Inc. of 11130 Warland Drive, Cypress California 90603, and Rawlings ® is a registered trademark of Rawlings Sporting Goods Company, Inc. of 510 Maryville University Drive, Suite 110, St. Louis Missouri 63141.

Testing of examples of the invention EX-4, EX-5 and EX-6 compared to performance of existing and competitive balls showed the following results. The example EX-4 was produced using a core comprising 80 phr polybutadiene rubber and 20 phr acrylonitrile-butadiene rubber. The ball of example EX-4 exhibited a compression loss of 22.2% after 70 hits at a test velocity of 60 mph. The compression loss observed is 27.7-59.4% lower than competitive Diamond® and Rawlings® products tested (Competitive Examples, C-1-C-11). The example EX-5 was produced using a core comprising 60 phr polybutadiene rubber and 40 phr acrylonitrile-butadiene rubber. The ball of example EX-5 exhibited a compression loss of 22.0% after 70 hits at a test velocity of 60 mph. The compression loss observed is 28.3-59.8% lower than competitive Diamond® and Rawlings® products tested (Competitive Examples, C-1-C-11). The ball of example EX-6 exhibited a compression loss of 24.4% after 70 hits at a test velocity of 60 mph. The compression loss observed is 20.5-55.4% lower than competitive Diamond® and Rawlings® products tested (Competitive Examples, C-1-C-11). Accordingly, the baseballs of EX-4, EX-5 and EX-6 each demonstrate an improvement in compression retention over existing competitive baseballs, and the improvement in compression retention is significant, ranging from 20.5 percent better to 59.8 percent better.

Table 4 illustrates further that baseballs built in accordance with the present invention are exceptionally durable, demonstrating exceptional compression retention values after 20, 40, 60, 80 and 100 impacts at 60 mph off a steel strike in accordance with ASTM F1887, and the baseballs also retain their COR. Therefore, baseballs built in accordance with the present invention retain their compression better and longer than existing baseballs and provide consistent performance with no measureable decrease in COR after numerous impacts. Accordingly, baseballs built in accordance with the present invention will provide a longer playable, useful life enabling players, teams and leagues to use fewer baseballs over the course of a game, a practice, a week or a season. Use of fewer balls, reduces the cost of the game, enables players, teams and leagues to maintain and/or transport fewer balls, results in less waste over time and improves the enjoyment.

In contrast, the data of Table 4 below from competitive test balls EX-19 through EX-34 illustrates a substantial and rapid decrease in ball compression after multiple impacts at 60 mph off a steel strike in accordance with ASTM F1887. After just 20 impacts, all but two of the competitive test balls (EX-25 and EX-26) exhibited a decrease in compression of greater than 15 percent. After 40 impacts, all of the competitive test balls of EX-19 through EX-34 exhibited a compression loss of greater than 15 percent, and, after 60 impacts, all of the competitive test balls exhibited a compression loss of greater than 25 percent. Six of the competitive test balls also exhibited a decrease in COR of greater than 2 percent (less than 98 percent) after 100 impacts. This rapid drop in performance can affect the play and feel of the ball overtime, and can render the ball unplayable.

TABLE 4

Compression Retention & COR Performance After Multiple Impacts

| Ex # | Ball | Size (in.) | Weight (g) | COR (Orig. Value) | Comp. (lbf) | Comp. (lbf) 20 Hits | Comp.-20 Hits (Decrease in Comp. by more than 15% from Orig. Value?) | COR - 20 Hits (Decrease in COR by 2% or more from Orig. Value?) | Comp. (lbf) 40 Hits | Comp.-40 Hits (Decrease in Comp. by more than 15% from Orig. Value?) | COR - 40 Hits (Decrease in COR by 2% or more from Orig. Value?) |
|---|---|---|---|---|---|---|---|---|---|---|---|
| EX-9 | Wilson 20ACN | 9.02 | 144 | 0.569 | 247 | 262 | NO | NO | 260 | NO | NO |
| EX-10 | Wilson 20ACN | 9.04 | 144 | 0.565 | 270 | 282 | NO | NO | 282 | NO | NO |
| EX-11 | Wilson 20ACN | 9.05 | 144 | 0.568 | 267 | 285 | NO | NO | 273 | NO | NO |
| EX-12 | Wilson 20ACN | 9.06 | 144 | 0.580 | 284 | 283 | NO | NO | 273 | NO | NO |
| EX-13 | Wilson 20ACN | 9.07 | 144 | 0.569 | 259 | 270 | NO | NO | 259 | NO | NO |
| EX-14 | Wilson 20ACN | 9.08 | 144 | 0.566 | 268 | 272 | NO | NO | 263 | NO | NO |
| EX-15 | Wilson 40ACN | 9.02 | 144 | 0.566 | 270 | 269 | NO | NO | 266 | NO | NO |
| EX-16 | Wilson 40ACN | 9.03 | 144 | 0.560 | 269 | 269 | NO | NO | 255 | NO | NO |
| EX-17 | Wilson 40ACN | 9.04 | 144 | 0.564 | 313 | 283 | NO | NO | 268 | NO | NO |
| EX-18 | Wilson 40ACN | 9.06 | 144 | 0.564 | 266 | 256 | NO | NO | 239 | NO | NO |
| EX-19 | Diamond (D1-PRO NFHS) | 9.00 | 144 | 0.547 | 267.2 | 203.3 | YES | NO | 192.2 | YES | NO |
| EX-20 | Diamond (D1-PRO NFHS) | 9.01 | 143.5 | 0.550 | 263.3 | 199.2 | YES | NO | 184.4 | YES | NO |
| EX-21 | Diamond (D1-PRO NFHS) | 9.00 | 143.5 | 0.542 | 265.1 | 196.7 | YES | NO | 181.9 | YES | NO |
| EX-22 | Diamond (D1-PRO NFHS) | 8.99 | 144.3 | 0.546 | 272.2 | 207.6 | YES | NO | 195.8 | YES | NO |
| EX-23 | Diamond (DLL RS-T) | 9.1 | 145.4 | 0.528 | 332.7 | 281 | YES | NO | 266.3 | YES | NO |
| EX-24 | Diamond (DLL RS-T) | 9.02 | 144.5 | 0.526 | 330.4 | 280 | YES | NO | 265.1 | YES | NO |
| EX-25 | Diamond (DLL RS-T) | 9.09 | 144.9 | 0.529 | 316 | 268.6 | NO | NO | 259.6 | YES | NO |
| EX-26 | Diamond (DLL RS-T) | 9.08 | 145 | 0.534 | 306.9 | 261.4 | NO | NO | 261 | YES | NO |

TABLE 4-continued

Compression Retention & COR Performance After Multiple Impacts

| Ex # | Ball | | | | | | | | | | |
|---|---|---|---|---|---|---|---|---|---|---|---|
| EX-27 | Rawlings (R1 NCAA) | 9.06 | 141.3 | 0.535 | 218.6 | 175.1 | YES | NO | 162.2 | YES | NO |
| EX-28 | Rawlings (R1 NCAA) | 9.04 | 142.2 | 0.533 | 228.5 | 182.5 | YES | NO | 172.8 | YES | NO |
| EX-29 | Rawlings (R1 NCAA) | 9.07 | 144.1 | 0.535 | 231.3 | 188.4 | YES | NO | 173 | YES | NO |
| EX-30 | Rawlings (R1 NCAA) | 9.04 | 142.7 | 0.541 | 215.2 | 173.6 | YES | NO | 160.2 | YES | NO |
| EX-31 | Rawlings (RLLB) | 9.07 | 146.1 | 0.545 | 277 | 177.8 | YES | NO | 161.4 | YES | NO |
| EX-32 | Rawlings (RLLB) | 9.09 | 145.6 | 0.542 | 284.7 | 186.8 | YES | NO | 172 | YES | NO |
| EX-33 | Rawlings (RLLB) | 9.09 | 143.9 | 0.545 | 261 | 164.8 | YES | NO | 150.8 | YES | NO |
| EX-34 | Rawlings (RLLB) | 9.14 | 147.1 | 0.549 | 275.4 | 176 | YES | NO | 154.5 | YES | NO |

| Ex # | Comp. (lbf) 60 Hits | Comp.- 60 Hits (Decrease in Comp. by more than 15% from Orig. Value?) | COR - 60 Hits (Decrease in COR by 2% or more from Orig. Value?) | Comp. (lbf) 80 Hits | Comp.- 80 Hits (Decrease in Comp. by more than 15% from Orig. Value?) | COR - 80 Hits (Decrease in COR by 2% or more from Orig. Value?) | Comp. (lbf) 100 Hits | Comp.- 100 Hits (Decrease in Comp. by more than 25% from Orig. Value?) | COR -100 Hits (Decrease in COR by 2% or more from Orig. Value?) | Comp Loss After 100 Hits (%) |
|---|---|---|---|---|---|---|---|---|---|---|
| EX-9 | 260 | NO | NO | 246 | NO | NO | 242 | NO | NO | 2.1 |
| EX-10 | 275 | NO | NO | 265 | NO | NO | 255 | NO | NO | 5.6 |
| EX-11 | 273 | NO | NO | 250 | NO | NO | 235 | NO | NO | 12.0 |
| EX-12 | 277 | NO | NO | 277 | NO | NO | 266 | NO | NO | 6.4 |
| EX-13 | 239 | NO | NO | 242 | NO | NO | 245 | NO | NO | 5.4 |
| EX-14 | 256 | NO | NO | 259 | NO | NO | 242 | NO | NO | 9.8 |
| EX-15 | 254 | NO | NO | 228 | NO | NO | 235 | NO | NO | 13.0 |
| EX-16 | 247 | NO | NO | 228 | NO | NO | 241 | NO | NO | 10.4 |
| EX-17 | 252 | NO | NO | 251 | NO | NO | 242 | NO | NO | 22.7 |
| EX-18 | 230 | NO | NO | 226 | NO | NO | 217 | NO | NO | 19.5 |
| EX-19 | 175.6 | YES | NO | 170 | YES | NO | 157 | YES | NO | 41.2 |
| EX-20 | 169 | YES | NO | 164.4 | YES | NO | 158.2 | YES | YES | 40.0 |
| EX-21 | 174.2 | YES | NO | 168.2 | YES | YES | 155.2 | YES | NO | 41.4 |
| EX-22 | 181 | YES | NO | 169.4 | YES | NO | 158.3 | YES | YES | 41.8 |
| EX-23 | 244.9 | YES | NO | 232 | YES | NO | 220.6 | YES | NO | 33.7 |
| EX-24 | 241.1 | YES | NO | 225 | YES | NO | 218.2 | YES | NO | 34 |
| EX-25 | 235.1 | YES | NO | 221.2 | YES | NO | 211.7 | YES | NO | 33 |
| EX-26 | 229 | YES | NO | 223.5 | YES | NO | 207 | YES | NO | 32.6 |
| EX-27 | 149.8 | YES | NO | 147.4 | YES | NO | 141.4 | YES | NO | 35.4 |
| EX-28 | 155.8 | YES | NO | 149.4 | YES | NO | 144.5 | YES | NO | 36.8 |
| EX-29 | 159.2 | YES | NO | 151.2 | YES | NO | 147.2 | YES | NO | 36.4 |
| EX-30 | 152.6 | YES | NO | 145.7 | YES | NO | 138.9 | YES | NO | 35.4 |
| EX-31 | 153.9 | YES | YES | 141.8 | YES | YES | 131 | YES | YES | 52.7 |
| EX-32 | 161.7 | YES | NO | 145.8 | YES | YES | 135 | YES | YES | 52.6 |

TABLE 4-continued

| | Compression Retention & COR Performance After Multiple Impacts | | | | | | | | |
|---|---|---|---|---|---|---|---|---|---|
| EX-33 | 138.4 | YES | NO | 124.6 | YES | YES | 115.7 | YES | YES | 55.6 |
| EX-34 | 149.4 | YES | YES | 136.2 | YES | YES | 125.3 | YES | YES | 54.5 |

The baseballs of EX-9 through EX-14 (like the baseballs of EX-4) were produced using a core comprising 80 phr polybutadiene rubber and 20 phr acrylonitrile-butadiene rubber, and the baseballs of EX-15 through EX-18 were produced using a core comprising 60 phr polybutadiene rubber and 40 phr acrylonitrile-butadiene rubber. The baseballs of EX-9 through EX-14 exhibited a loss in compression between 2.1 and 12.0 percent after 100 hits of 60 mph off of a steel strike plate, while maintaining consistent COR performance within the specification range. In fact, the COR value never dropped below 98 percent of the original COR value measured before undergoing hits. The baseballs of EX-15 through EX-18 exhibited a loss in compression between 10.4 and 22.7 percent after 100 hits of 60 mph off of a steel strike plate, while maintaining consistent COR performance within the specification range. In fact, the COR value never dropped below 98 percent of the original COR value measured before undergoing hits.

Accordingly, the baseballs of examples EX-9 through EX-18 demonstrate that balls built in accordance with the present invention, maintain compression very well after repeated impacts and maintain consistent COR performance within the specification range. In fact, COR performance of the balls of examples EX-9 through EX-18 does not degrade below 98 percent of the original COR value, even after 100 impacts (or hits). The COR performance of the balls of EX-9 through EX-18 stays generally the same with only minor variations. The COR values of the baseballs built in accordance with the present invention do not significantly degrade over time. After 60 impacts, 80 impacts or 100 impacts in accordance with ASTM F1887, the COR values of the baseball are greater than 98 percent of the original COR value before the ball is subjected to the numerous impacts.

Baseballs of the present invention have a reduction in compression when measured in accordance with ASTM F1888 after the ball has been projected at 60 mph and impacted against a steel plate in accordance with ASTM F1887 at least 60 impacts, or at least 100 impacts, has a compression that is greater than 75 percent of the initial compression value of the ball before testing. In a more preferred embodiment, the ball 10 retains compression such that after undergoing 60 impacts against the strike plate, the compression value of the ball 10 is greater than 85 percent of the initial compression value of the ball 10 before being impacted.

The ball 10 of the present invention provides numerous advantages over existing balls. One significant advantage is the improved durability of the ball 10 as demonstrated by the improved retention of compression (and low reductions in compression) following repeated significant 60 mph impacts with a steel plate. The improved durability increases the useful life of the ball 10 thereby enabling a player, a coach, a team and/or a league to use fewer baseballs over time. Using fewer baseballs is cost effective, results in less waste and requires less equipment to be purchased, stored and transported. The consistent COR performance of the ball 10 indicates that the performance of the ball does not degrade or decrease over its useful life, thereby improving the consistency of play and performance by the player. Balls built in accordance with the present invention can fully meet the standards and/or requirements of one or more of the following baseball and softball organizations: National Federation of State High School Associations ("NFHS"); Little League; PONY; Babe Ruth League; American Amateur Baseball Congress ("AABC"); the NCAA BBCOR Standard or Protocol; Amateur Softball Association of America ("ASA"); United States Specialty Sports Association ("USSSA"); International Softball Federation ("ISF") Bat Certification Standards; National Softball Association ("NSA"); and the Independent Softball Association ("ISA"). Accordingly, the term "ball configured for organized, competitive play" refers to a ball that fully meets the ball bat standards and/or requirements of, and is fully functional for play in, one or more of the above listed organizations.

While the preferred embodiments of the invention have been illustrated and described, it will be appreciated that various changes can be made therein without departing from the spirit and scope of the invention. For example, the size and construction of the ball surrounding the core can be altered to fit the requirements of softball. Accordingly, it will be intended to include all such alternatives, modifications and variations set forth within the spirit and scope of the appended claims.

What is claimed is:

1. A baseball capable of being tested under ASTM Standard Test Method F1888-09 for compression-displacement and under ASTM Standard Test Method F1887-09 wherein the baseball is projected at a strike plate at a speed of approximately 60 mph to measure the coefficient of restitution (COR) of the baseball, the baseball comprising:
   a core formed of a diene-based rubber composition, the core having a diameter of less than 2.0 inches and a weight less than 1.5 ounces;
   at least one layer of yarn surrounding the core; and
   a cover assembly surrounding the at least one layer of yarn, the baseball having a circumference within the range of 8.85 inches to 9.5 inches and a weight of less than 5.5 ounces, the baseball having an initial compression value obtained in accordance with ASTM Standard Test Method F1888-09 and a second compression value obtained in accordance with ASTM Standard Test Method F1888-09 after the baseball has undergone at least 60 impacts of approximately 60 mph against the strike plate, the second compression value being greater than 75 percent of the initial compression value, the initial compression of the baseball being at least 200 lbs.

2. The baseball of claim 1, wherein the baseball has an initial COR value when tested in accordance with ASTM F1887-09 and a second COR value measured in accordance with ASTM F1887-09 after the baseball has undergone at least 60 impacts of approximately 60 mph against the strike plate, and wherein the second COR value is greater than 98 percent of the initial COR value.

3. The baseball of claim 1, wherein the baseball is capable of being tested under ASTM Standard Test Method F1888-09 for compression-displacement, and wherein the baseball has an initial compression value obtained in accordance with ASTM Standard Test Method F1888-02 and a second compression value obtained in accordance with ASTM Standard Test Method F1888-09 after the baseball has undergone at least 60 impacts of approximately 60 mph against the strike plate, and wherein the second compression value is greater than 85 percent of the initial compression value.

4. The baseball of claim 1, wherein the baseball is capable of being tested under ASTM Standard Test Method F1888-09 for compression-displacement, and wherein the baseball has an initial compression value obtained in accordance with ASTM Standard Test Method F1888-09 and a third compression value obtained in accordance with ASTM Standard Test Method F1888-09 after the baseball has undergone at least 100 impacts of approximately 60 mph against the strike plate, and wherein the second compression value is greater than 75 percent of the initial compression value.

5. The baseball of claim 1, wherein the core is a one piece, solid core and the diene-based rubber composition is homogeneous throughout the core.

6. The baseball of claim 1, wherein the diene-based rubber composition includes a poly-butadiene rubber having a cis-1,4 content of greater than 35 percent.

7. The baseball of claim 1, wherein the diene-based rubber composition includes a poly-butadiene rubber having a cis-1,4 content of greater than 90 percent.

8. The baseball of claim 1, wherein the diene-based rubber composition is crosslinked using a peroxide initiator.

9. The baseball of claim 1, wherein the at least one layer of yarn is selected from the group consisting of wool, synthetic fibers, rayon fibers, acrylic fibers, polyester fibers, cotton, yarn and combinations thereof.

10. The baseball of claim 1, wherein the at least one layer of yarn includes 85 percent wool.

11. The baseball of claim 1, further comprising at least one layer of cotton foundation winding positioned between the core and the cover assembly.

12. The baseball of claim 1, wherein the cover assembly includes two cover panels connected to at least each other through a stitching.

13. The baseball of claim 12, wherein the cover panels are formed of a material selected from the group consisting of leather, synthetic leather, split leather, polyurethane, polyvinylchloride and combinations thereof.

14. The baseball of claim 1, wherein the diene-based rubber composition is selected from the group consisting of a polybutadiene, an acrylonitrile-polybutadiene and a combination thereof.

15. The baseball of claim 14, wherein the diene-based rubber composition is formed of 100 phr of high-cis polybutadiene rubber.

16. The baseball of claim 14, wherein the diene-based rubber composition is formed of 80 phr of high-cis polybutadiene rubber and 20 phr of acrylonitrile-butadiene rubber.

17. The baseball of claim 14, wherein the diene-based rubber composition is formed of 60 phr of high-cis polybutadiene rubber and 40 phr of acrylonitrile-butadiene rubber.

18. The baseball of claim 1, wherein the diene-based rubber composition includes a co-crosslinking agent.

19. The baseball of claim 18, wherein the co-crosslinking agent is a zinc salt of an unsaturated acrylate ester.

20. The baseball of claim 18, wherein the co-crosslinking agent comprises zinc diacrylate.

21. A baseball comprising:
a core defining a center and formed of a diene-based rubber composition, the composition including,
100 parts by weight of a diene rubber,
10 to 30 parts by weight of a co-crosslinking agent,
1 to 10 parts by weight of a metal oxide activator,
0.1 to 3 parts by weight of a peroxide initiator, and
0 to 30 parts by weight of an inorganic filler;
at least one layer of yarn surrounding the core, the at least one layer of yarn having a first thickness measured radially from the center of the core, the core having a weight of less than 1.5 ounces;
a foundation layer surrounding the at least one layer of yarn; and
a cover assembly surrounding the at least one layer of yarn and the foundation layer, the cover assembly having a second thickness measured radially from the center of the core, and including two cover panels connected to at least each other through a stitching, the first thickness being greater than or equal to the second thickness, the baseball having an initial compression value obtained in accordance with ASTM Standard Test Method F1888-09 that is at least 200 lbs.

22. The baseball of claim 21, wherein the baseball has a circumference of less than 9.5 inches and a weight of less than 5.5 ounces, and wherein the core has a diameter of less than 2.0 inches and a weight of less than 1.5 ounces.

23. The baseball of claim 21, wherein the baseball has an initial coefficient of restitution (COR) value when tested in accordance with ASTM F1887-09 wherein the baseball is projected at a speed of approximately 60 mph at a strike plate, and wherein the baseball has a second COR value measured after the baseball has undergone at least 60 impacts of approximately 60 mph against the strike plate, and wherein the second COR value is greater than 98 percent of the initial COR value.

24. The baseball of claim 21, wherein the baseball is capable of being tested under ASTM Standard Test Method F1888-09 for compression-displacement, wherein the baseball has a second compression value obtained in accordance with ASTM Standard Test Method F1888-09 after the baseball has undergone at least 60 impacts of approximately 60 mph against the strike plate in accordance with ASTM Standard Test Method F1887-09, and wherein the second compression value is greater than 75 percent of the initial compression value.

25. The baseball of claim 21, wherein the diene-based rubber is selected from the group consisting of a polybutadiene, an acrylonitrile-polybutadiene and a combination thereof.

26. The baseball of claim 21, wherein the diene-based rubber includes a poly-butadiene rubber having a cis-1,4 content of greater than 35 percent.

27. The baseball of claim 21, wherein the diene-based rubber includes a poly-butadiene rubber having a cis-1,4 content of greater than 90 percent.

28. The baseball of claim 21, wherein the diene-based rubber is formed of 80 phr of high-cis polybutadiene rubber and 20 phr of acrylonitrile-butadiene rubber.

29. The baseball of claim 21, wherein the diene-based rubber is formed of 60 phr of high-cis polybutadiene rubber and 40 phr of acrylonitrile-butadiene rubber.

30. The baseball of claim 21, wherein the co-crosslinking agent is a zinc salt of an unsaturated acrylate ester.

31. The baseball of claim 21, wherein the cover panels are formed of a material selected from the group consisting of leather, synthetic leather, split leather, polyurethane, polyvinylchloride and combinations thereof.

* * * * *